(12) United States Patent
Lewin et al.

(10) Patent No.: US 11,614,366 B2
(45) Date of Patent: Mar. 28, 2023

(54) TIRE TEMPERATURE OPTIMIZATION SYSTEM AND METHOD FOR USE

(71) Applicant: PROAWE INNOVATIONS LLC, Crawfordsville, IN (US)

(72) Inventors: Michael Lewin, West Lafayette, IN (US); Ian Girvan, Crawfordsville, IN (US)

( * ) Notice: Subject to any disclaimer, the term of this patent is extended or adjusted under 35 U.S.C. 154(b) by 252 days.

(21) Appl. No.: 16/641,583

(22) PCT Filed: Aug. 23, 2018

(86) PCT No.: PCT/US2018/047626
§ 371 (c)(1),
(2) Date: Feb. 24, 2020

(87) PCT Pub. No.: WO2019/040682
PCT Pub. Date: Feb. 28, 2019

(65) Prior Publication Data
US 2021/0156743 A1 May 27, 2021

Related U.S. Application Data

(60) Provisional application No. 62/549,192, filed on Aug. 23, 2017.

(51) Int. Cl.
*B60C 23/04* (2006.01)
*B60C 23/20* (2006.01)
(Continued)

(52) U.S. Cl.
CPC ............ *G01J 5/10* (2013.01); *B60C 23/0486* (2013.01); *B60C 23/20* (2013.01); *G01J 5/0003* (2013.01);
(Continued)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004;
(Continued)

(56) References Cited

U.S. PATENT DOCUMENTS 8,547,216 B2 * 10/2013 Cao .................... B60C 23/20
340/463
2014/0180534 A1 * 6/2014 Son .................... B60C 23/20
701/1
2016/0343178 A1 * 11/2016 Lesesky .......... G06K 19/07758

* cited by examiner

*Primary Examiner* — Andre J Allen
(74) *Attorney, Agent, or Firm* — Gutwein Law; Greg N. Geiser

(57) ABSTRACT

A tire temperature monitoring system, method, and associated devices for installation into a vehicle. The system and method adapted to determine the optimal tire temperature for increased vehicle performance through the collection of tire temperature, various external conditions, historical data, and predictive algorithms to inform a user to the optimal temperature through a visual display.

19 Claims, 2 Drawing Sheets

Figure 1:
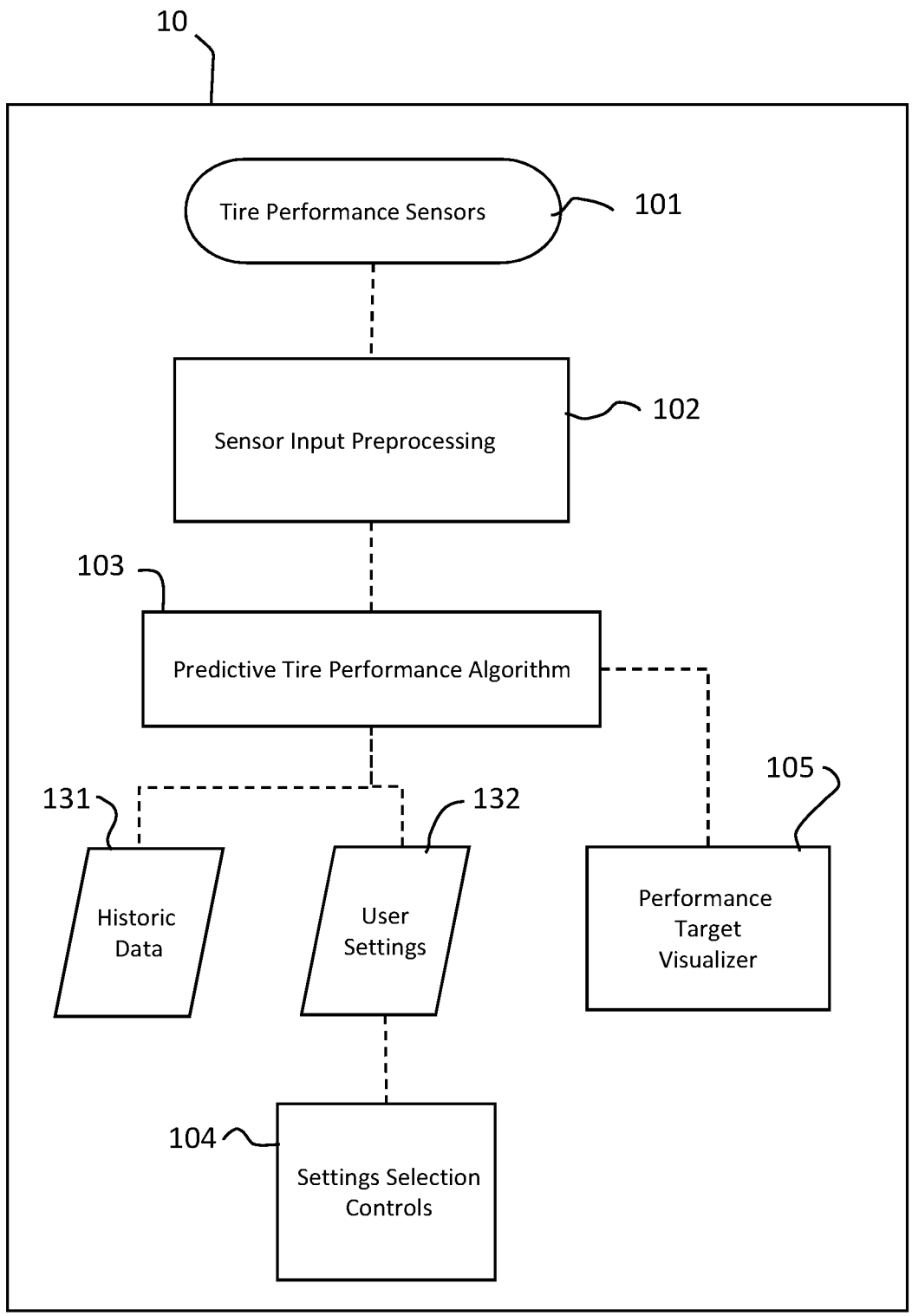

(51) Int. Cl.
　　　*G01L 17/00*　　　(2006.01)
　　　*G01J 5/00*　　　(2022.01)
　　　*G01J 5/10*　　　(2006.01)
　　　*B60C 19/00*　　　(2006.01)

(52) U.S. Cl.
　　　CPC ........ *G01L 17/00* (2013.01); *B60C 2019/004* (2013.01); *G01J 2005/106* (2013.01)

(58) Field of Classification Search
CPC ............. B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; G01S 13/88
USPC ................................. 73/146–146.8
See application file for complete search history.

TIRE TEMPERATURE OPTIMIZATION SYSTEM AND METHOD FOR USE

CROSS REFERENCE TO RELATED APPLICATIONS

This application claims priority to U.S. Provisional Patent Application No. 62/549,192 filed 23 Aug. 2017 to the above named inventors, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present invention relates to an improved system and method for detecting and displaying the optimal tire temperature for improved vehicle performance.

BACKGROUND OF THE INVENTION

During the operation of a vehicle, the only component of the vehicle that directly contacts a surface is the tires. Accordingly, the type, material, tread pattern, tread depth, dimensions, and temperature of the tires play a critical role in ensuring a safe, smooth, and efficient ride. This is of particular importance as speed and handling requirements are increased in events such as automobile racing. Within racing competition it is particularly important that the tires are optimized to provide adequate adhesion during maneuvers and launch. One method of optimizing adhesion is to ensure that the tire surface in contact with a road surface is at a preferred temperature. Typically, this optimal temperature range is within a very narrow range and only relayed to a driver through the performance of the vehicle during operation.

Given these current limitations, there is a need for a device that has the ability to accurately measure the temperature of tires, utilize known and predicted data to provide an optimal performance temperature, and display this information visually to both the driver and remotely to the crew of the vehicle. Preferably, this system and method utilizes non-contact sensors configured to monitor tire condition and performance and relay relevant information wirelessly to a remote computing device to support further processing, monitoring and the logging of the data. Additionally, the information can be displayed directly to a driver, allowing the driver to monitor real-time tire condition during operation.

SUMMARY OF THE INVENTION

The system and method of the present disclosure generally relates to a plurality of sensors and systems to measure, interpret, analyze, and otherwise determine the optimal tire temperature of a vehicle as it relates to the performance of that vehicle. In particular, the system and method for use is configured to measure the temperature of various zones and various positions across a tire surface, measure the tire pressure, measure the temperature of various external conditions, such as the ambient and surface temperatures, and utilize these measurements to determine the optimal temperature of the tires for use in obtaining a desired performance.

The system and method of the present disclosure compiles the data and analysis for display to a user of the system within the vehicle and to a remote user positioned outside of the vehicle through wireless protocols. Preferably, the system and method is adaptable to multiple vehicles and types of races; i.e. road racing, oval track, drag. Although, multiple race types and vehicles may benefit from use of the system and method, the system and method may have specific applicability to determine the optimal tire temperature for the launch of a vehicle from a stationary position in an event, such as a drag race.

The method of the present disclosure generally utilizes a plurality of tire performance sensors to measure tire temperature, surface temperature, and tire pressure and a processing system configured to allow for use of various inputs in the form of historical data and preferred user settings, to generate a predicted performance and notify a user when an optimal tire condition is obtained. Accordingly, this optimal tire condition is based upon a predetermined formula and utilized to generate an optimal tire temperature for maximum performance that can be delivered in a visual form to a user through a display.

The materials necessary to perform this method and display the optimal temperature include, but are not limited to; tire temperature sensors, surface temperature sensors, tire pressure sensors, processors configured to utilize gathered information to generate a predictive result, and at least one display device.

BRIEF DESCRIPTION OF THE SEVERAL VIEWS OF THE DRAWING(S)

Figure 2:
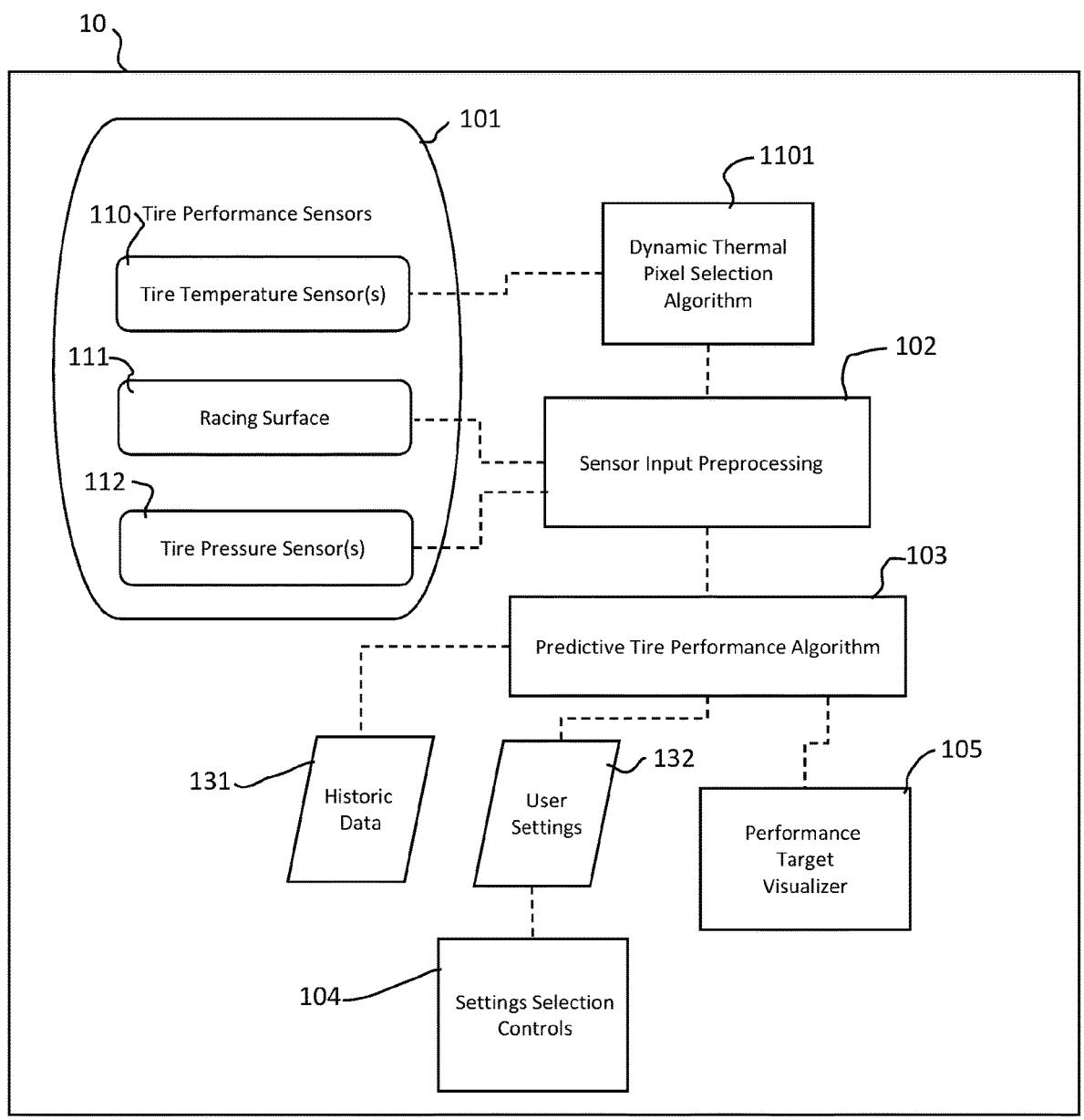

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 1 is a flow diagram of the functional components of the system and method according to the present invention; and FIG. 2 is a flow diagram of the mechanical components necessary to enable the functional components of the system and method, according to the present invention

DETAILED DESCRIPTION OF THE INVENTION

The following detailed description includes references to the accompanying drawings, which form a part of the detailed description. The drawings shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS., with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIGS. 1-2, of the tire condition optimization system and method of the present disclosure and generally referred to as system 10. The system 10 and method of use of the present disclosure is generally configured to measure, monitor, predict, and provide a user of the system 10 the optimal tire temperature for optimal performance of a vehicle having the components of the system 10 installed and utilized.

The system 10 and methods for use are generally provided to a user as an entire system of various complimentary components that can provide a user with an "all-in-one" package that can be installed, implemented, and utilized by the user. The system 10 processing means and memory components can be directly integrated into hardware elements of the system 10 or alternately the processing means and memory components can be communicatively connected in a coupling at a remote location and transmitted to a vehicle the system 10 is used within. Accordingly, it is to be understood that the processing means and memory can be located on the vehicle or remotely from the vehicle. The processing means is preferably communicatively coupled to a display, referred to generically as a visualizer 105.

Accordingly, the system and method 10 can be functionally described through corresponding steps, wherein tire performance sensors 101 are installed within a vehicle and a corresponding tire and utilized to measure tire temperature 110, surface temperature 111, and tire pressure 112. Furthermore, in some exemplary embodiments the system can measure tire emissivity. Emissivity generally defined as the power of a surface to emit heat by radiation. The emissivity of a given surface is represented as a number between 0 and 1 being the ratio of the radiant energy emitted by a surface to that emitted by a blackbody at the same temperature.

The various measurements utilized by the system 10 and method for use can be taken at various locations of the tire and over a pre-determined amount of time. The measurements 110-112 are provided in a signal that is then processed at step 102, wherein the sensor inputs signals are preprocessed to create a usable data set that can be utilized within a processing step 103, wherein an algorithm is utilized to predict an optimal tire performance temperature.

The processing step 103 will utilize the preprocessed sensor inputs 102, historical data 131 that may be provided based upon past performance, various user settings 132, wherein a user can select controls 104 based upon their knowledge or experiences as an input.

The final step in the system 10 and method for use will provide a user with a visual representation 105 on a display device of the preferred target temperature for optimal performance.

The tire temperature sensor(s) 110 of the present invention will comprise at least two (2) infrared (IR) temperature sensor arrays that are capable of taking multiple unique measurements across a tire surface. The measurements from the sensor 110 can be further processed through a pixel selection algorithm 1101 wherein the signals are utilized to determine a given tire temperature within at least three (3) temperature zones, including, but not limited to, the inside, middle, and outside of the tire. These at least three temperature zones are averaged within the step at 1101 for utilization with the algorithm 103 and visualizer 105, although the individual data collected from the individual zones will still be collected and provided wirelessly to a centralized collecting and processing device for data logging and later use.

The visualizer 105 of the present invention 10 is generally adapted for placement in the vehicle and positioned within the line of sight of a user. Accordingly, processed measurements can be provided to the driver to indicate when the tires have reached the preferred temperature for optimal performance. This visualizer 105 may be a simple LED tree of various colors, such as red, green, and yellow, to indicate whether the optimal temperature has been reached or it may be a LCD screen display configured to displaying a temperature or simple message to indicate to a driver that the optimal temperature has been reached.

The system 10 and method of and use is particularly useful for drag racing and wherein a general staging period is utilized to preheat the tires for optimal performance through a "burn-out" procedure. A "burn-out" is a tire heating method where the tires are intentionally and rapidly rotated to generate heat and increase friction for optimal launch. Accordingly, the length and veracity of the burn-out can be increased, decreased, or altered to ensure optimal tire temperature is reached.

When using the system 10 and method for use of the present disclosure, the visualizer 105 is configured to indicate to a driver when the optimal temperature is reached. Accordingly, the system and method 10 will utilize the various measurements of the sensors 101, historical data 131, user settings 132, and selections to calculate the optimal temperature. These measurements and settings of particular importance may include, but are not limited to, track surface temperature 111, lane selection, delay time after staging, ambient temperature, humidity or other weather conditions, tire wear patterns, tire material types, tread pattern, tire compound emissivity, and other similar settings or measurements. Additionally, the measurements and settings can be used as a condition database stored on the memory. The condition database and historical data can be used in calculating the optimal tire temperature.

Preferably, the tire temperature sensor 110 of the present invention 10 is provided in an array of infrared sensors arranged in a 16×4 grid and configured for removable installation in area adjacent to a tire and generally positioned in an area to secure the sensor 110 and prevent exposure to moisture and contamination.

Preferably, the sensors 101 of the present invention 10 are adapted for wireless communication with additional sensors within the vehicle or with remote computing devices that may be placed within or external to the vehicle and wherein the sensors 101 and other devices of the system 10 and method are configured to communicate through various protocols, including, but not limited to Bluetooth, CAN, I2C, USB, or Serial.

In other alternate embodiments, the system 10 and method for use of the present disclosure can be communicated to and coupled with an engine management system. Based on the tire condition measurements and optimization calculations, the system 10 can further calculate the optimal power to be applied by the engine management system to ensure optimized launch by the vehicle. This can prevent suboptimal tire slip when too much power or torque is applied to the tires, especially when the optimal temperature during the launch period falls out of a determined optimal range or is not achieved.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the specification.

What is claimed is:

1. A tire temperature monitoring system for a vehicle, the system comprising:
    an infrared temperature sensor array aligned for the measurement of an external surface temperature of the tire, wherein the infrared temperature sensor array is configured to obtain temperature data across the tire surface, wherein the measurements are processed through a pixel selection algorithm to determine a tire temperature within at least three temperature zones, including an inside zone, a middle zone, and an outside zone;
    a computing device, the computing device configured to receive the temperature of the infrared sensor, a plurality of inputs from a user, a modicum of historical data, and a display, the display providing a visual cue to a user the optimal tire temperature for performance, wherein the computing device is configured to determine of the optimal temperature utilizing the temperature data.

2. A system as in claim 1, wherein the system includes a wireless transmitter coupled to the computing device, wherein the wireless transmitter is configured for communication with an external device adapted for the storage of data.

3. A system as in claim 1, wherein the system includes a second infrared tire sensor aligned for the measurement of the external surface temperature of the tire.

4. A system as in claim 1, wherein the system includes a surface temperature sensor.

5. A system as in claim 1, wherein the system includes a tire pressure sensor.

6. A system as in claim 1, wherein the infrared temperature sensor is provided in an array of infrared sensors arranged in a 16×4 grid.

7. A system as in claim 2, wherein the system comprises a plurality of temperature sensors configured for removable installation into the vehicle.

8. A system configured to determine an optimal condition of a tire during operation of a vehicle, the system comprising:
    a plurality of tire performance sensors configured for measurement and generating a first signal corresponding to the measurement of tire surface temperature, tire wear patterns, tire material types, tread pattern, and tire compound emissivity;
    one or more environment sensor configured for measuring and generating a second signal corresponding to the measurement of track surface temperature, delay time after staging, ambient temperature, and humidity;
    a computing device, the computing device coupled to the tire performance
        sensors and environment sensors configured to receive the first signal and second signal, the computing device including a processor configured to use the first signal and second signal to determine when the optimal condition is reached; and a visualizer, the visualizer providing a visual cue to a user that the optimal tire condition has been reached.

9. A system as in claim 8, wherein the plurality of performance sensors includes at least one tire temperature senor and a surface temperature sensor.

10. A system as in claim 9, wherein the plurality of performance sensors includes a tire pressure sensor.

11. A system as in claim 8, wherein the system includes a wireless transmitter coupled to the computing device, wherein the wireless transmitter is configured for communication with an external device adapted for the storage of data.

12. A system as in claim 9, wherein the at least one tire temperature sensor is an infrared temperature sensor.

13. A system as in claim 12, wherein the at least one tire temperature sensor is provided in an array of infrared sensors arranged in a 16×4 grid.

14. A system as in claim 1, wherein the system further comprises a tire emissivity sensor to measure to determine the emissivity data, wherein the emissivity data and temperature data are utilized by the computing device to determine the optimal tire temperature.

15. A system configured to determine an optimal condition of a tire during operation of a vehicle, the system comprising:

a tire temperature sensor, wherein the tire temperature sensor is configured to obtain temperature data across the tire surface, wherein the measurements are processed through a pixel selection algorithm to determine a tire temperature within at least three temperature zones, including an inside zone, a middle zone, and an outside zone to generate a first tire temperature signal;

a surface temperature sensor configured to generate a surface temperature signal;

a tire pressure sensor configured to generate a tire pressure signal;

a computing device, the computing device coupled to the tire temperature sensor, the surface temperature sensor, and the tire pressure sensor, the computing device configured to receive the first tire temperature signal, the surface temperature signal, and the tire pressure signal, the computing device including a processor configured to use the first tire temperature signal, the surface temperature signal, and the tire pressure signal to determine when the optimal condition is reached; and a visualizer, the visualizer providing a visual cue to a user that the optimal tire condition has been reached.

16. A system as in claim 15, wherein the system includes a second tire temperature sensor configured to generate a second tire temperature signal.

17. A system as in claim 16, wherein the first tire sensor and the second tire sensor are infrared temperature sensors.

18. A system as in claim 16, wherein the first tire sensor and the second tire sensor are provided in an array of infrared sensors arranged in a 16×4 grid.

19. A system as in claim 15, wherein the tire temperature sensor is configured for removable installation into the vehicle.

* * * * *